US005736253A

United States Patent [19]

Hinchcliffe et al.

[11] Patent Number: 5,736,253

[45] Date of Patent: Apr. 7, 1998

[54] HOT-STAMPING FOILS

[76] Inventors: Trevor Thomas Hinchcliffe, 32d Forrester Park Road, Edinburgh, Scotland, EH12 9AG; Philip Norman Spencer, 3 Hallcroft Park, Ratho, Midlothian, Scotland, EH38 8RZ; James Clifford Kelly, 185 Causewayside Street, Newington, Edinburgh, Scotland

[21] Appl. No.: 620,840

[22] Filed: Mar. 20, 1996

[30] Foreign Application Priority Data

Mar. 20, 1995 [GB] United Kingdom .................... 9505606

[51] Int. Cl.[6] ........................... B32B 15/08; B32B 27/00; B32B 15/04

[52] U.S. Cl. .......................... 428/461; 428/457; 428/460; 428/500; 428/469

[58] Field of Search ...................................... 428/463, 457, 428/461, 469, 458, 460, 500, 501, 524

[56] References Cited

U.S. PATENT DOCUMENTS 4,255,308 3/1981 Brasen ........................... 260/29.6 RW
4,921,906 5/1990 Meyer et al. ............................ 525/53
5,182,323 1/1993 Russell ..................................... 524/322
5,439,946 8/1995 Klumperman et al. .................... 521/77

FOREIGN PATENT DOCUMENTS 0 520 300 12/1992 European Pat. Off. .

OTHER PUBLICATIONS

UK Patent Office Search Report.
English-language Abstract of Japanese 910048868.

*Primary Examiner*—John J. Zimmerman
*Assistant Examiner*—Michael LaVilla
*Attorney, Agent, or Firm*—Burns, Doane Swecker & Mathis

[57] ABSTRACT

A hot-stamping foil including a metallic layer carried on flexible carrier layer, and having a layer of heat-activated adhesive on the underside of the metallic layer and a layer of a lacquer composition coating the upper surface of the metallic layer, the lacquer being a blend of at least 50% by weight, based on the total dry weight of the lacquer composition, of a copolymer of styrene and maleic anhydride (SMA copolymer) with at least one other acrylic copolymer selected from polymethylmethacrylate copolymers, polyacrylic acid copolymers and styrene/acrylic acid copolymers. Such lacquers have an improved heat resistance.

11 Claims, 1 Drawing Sheet

HOT-STAMPING FOILS

BACKGROUND OF THE INVENTION

1. Field of the Invention

The present invention relates to hot-stamping foils. More particularly, the present invention relates to hot-stamping foils having a metallic layer coated with a lacquer composition and in which the lacquer composition is based on a copolymer of styrene and maleic anhydride.

2. Description of the Related Art

Hot-stamping foils comprise a plurality of layers. Usually, a metallic layer or a pigmented layer which is to be adhered to a surface to be printed by means of an adhesive layer on the underside of the metallic or pigmented layer is carried on a plastics carrier layer, e.g. of polyester. A thin film of a release agent is interposed between the plastics carrier layer and the metallic or pigmented layer thereby to facilitate separation of the metallic or pigmented layer from the carrier layer after adhesion of the metallic or pigmented layer to the surface to be printed has taken place.

In hot-stamping foils which incorporate a metallic layer it is customary to include a layer of lacquer over the metallic layer. The layer of lacquer influences the final appearance of the metal foil, both in terms of colour (e.g. improved gold metallic effects) and in terms of lustre (e.g. gloss, satin or matt effects).

In use, the hot stamping foil is applied to a surface to be printed and subjected to the simultaneous application of heat and pressure. This causes activation of the adhesive layer and the release layer and results in firm adhesion of the metallic layer to the surface to be printed. The carrier layer can then readily be removed from the printed surface, leaving the metallic or pigmented layer firmly adhered to the printed surface.

SUMMARY OF THE INVENTION

The maximum application temperature of a metallic stamping foil is largely dependent upon the thermal properties of the lacquer system itself. For example, if the face temperature of the impression die during the hot-stamping process is significantly higher than the glass transition temperature (Tg) of the lacquer, a reduction in the gloss finish of the lacquer with a consequent "dulling" effect is often observed.

The temperature at which the lacquer dulls is hereinafter referred to as the 'dulling temperature'. The dulling temperature can be increased by raising the Tg of the lacquer, for example by introducing cross-linking into the lacquer composition.

The majority of lacquer systems currently utilised for metallic hot stamping foils are based upon nitrocellulose polymethylmethacrylate blends. Chlorinated rubber is also used in place of nitrocellulose, but this material is being gradually phased out for environmental reasons.

Furthermore, high temperatures of 155° C. are now commonly encountered on cylinder hot foil blocking presses for applications in the labels sector. The majority of existing metallic stamping foils incorporating either chlorinated rubber or nitrocellulose lacquer systems are not considered suitable for use in such high temperatures blocking presses because of the relatively low dulling temperatures (120°–140° C.) of these lacquer systems.

We have now found that hot-stamping foils having improved properties can be obtained by the use of lacquer systems based on styrene/maleic anhydride copolymers (hereinafter referred to as SMA copolymers).

Accordingly, the present invention provides a hot-stamping foil including a metallic layer carried on a flexible carrier layer, and having a layer of heat-activated adhesive on the underside of the metallic layer and a layer of a lacquer composition coating the upper surface of the metallic layer, the lacquer being a blend of at least 50% by weight, based on the total dry weight of the lacquer layer, of a copolymer of styrene and maleic anhydride (SMA copolymer) with at least one other acrylic copolymer selected from polymethylmethacrylate copolymers, polyacrylic acid copolymers and styrene/acrylic acid copolymers.

DESCRIPTION OF THE PREFERRED EMBODIMENTS

Figure 1:
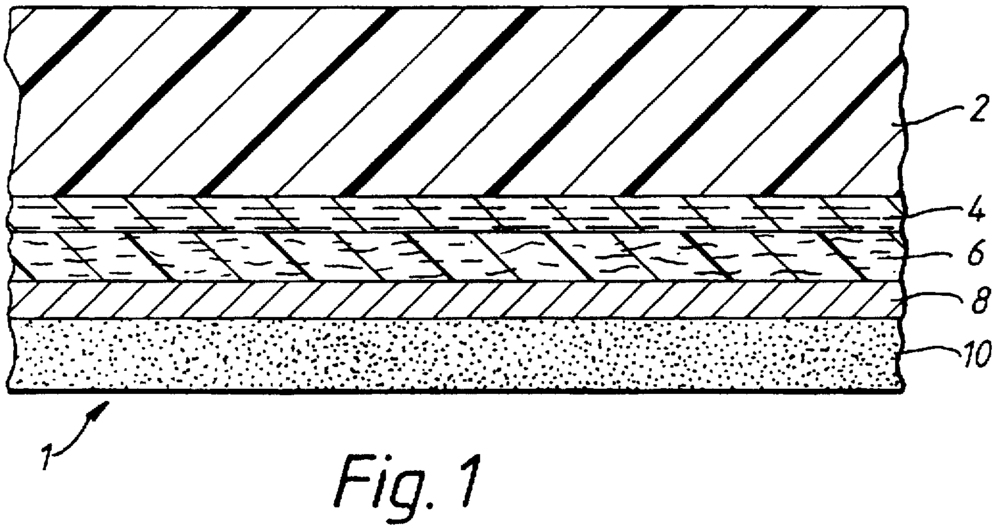
FIG. 1 illustrates the structure of a typical hot-stamping foil according to the invention.

We have found that incorporation of lacquers based on styrene/maleic anhydride copolymers in hot-stamping foils provides foils which have improved "dulling temperatures" relative to hot-stamping foils which incorporate lacquers based on nitrocellulose or chlorinated rubber. Thus, an advantage of the hot-stamping foils of the invention is that the SMA copolymers used therein provide lacquer compositions having a dulling temperature which is higher than 150° C. and, as a result, the hot-stamping foils of the invention are suitable for use on cylinder hot foil blocking presses in which temperatures of about 155° C. are encountered.

The amount of the styrene/maleic anhydride (SMA) copolymer which is present in the lacquer composition is usually from 50 to 80% by weight, more preferably from 60 to 70% by weight, based on the total dry weight of the lacquer composition.

The preferred SMA copolymers are characterised by high glass transition temperatures, i.e. Tg values >150° C., by relatively low solution viscosity and high acid functionality.

Preferably, the mole ratio of styrene/maleic anhydride in the SMA copolymer is 1:1, and the average molecular weight of the SMA copolymer ranges from 1,000 to 300,000 g/mol, most preferably 2,000 to 20,000 g/mol.

Preferably, the other acrylic copolymer is a polymethylmethacrylate copolymer, polyacrylic acid copolymer or styrene acrylic copolymer, each having an average molecular weight of from 20,000 to 200,000 g/mol, and a glass transition temperature lower than that of the SMA copolymer in the lacquer composition, i.e. a glass transition temperature Tg of from 75° to 110° C.

The preferred amount of the said other acrylic copolymer ranges from 20 to 50% by weight, based on the total dry weight of the lacquer composition.

The lacquer compositions may optionally contain an ionomeric cross-linking agent such as zirconium propionate, zirconium acetate, zirconium acetylacetonate and titanium acetylacetonate. These ionomeric cross-linking agents are usually used in amounts of from 1 to 7% by weight, based on the total dry weight of the lacquer composition.

The ionomeric crosslinking agents can be incorporated in the lacquer compositions to obtain additional increases in dulling temperature of 5° to 10° C. if required. Zirconium propionate is known to react with the functional carboxy groups of polymers during the solvent evaporation process. Similar interactions are thought to be responsible for extra heat resistance.

The lacquer composition is prepared by dissolving the components of the lacquer in an organic solvent. Typical solvents include methyl ethyl ketone (MEK), industrial methylated spirits (IMS) and toluene. Typically, the organic solvent is present at approximately 75 to 80% by weight, based on the total weight of the lacquer composition.

The metallic layer in the hot-stamping foils of the invention is conventional, usually of aluminium, and is obtained in conventional manner by using a vacuum metallisation process.

The adhesive layer is a heat-activated adhesive layer applied in conventional manner by gravure coating. Preferred such adhesives are those described in our co-pending U.K. Patent Application No. 9505607.3. These preferred adhesives are blends of (i) a vinylpyrrolidone-/vinylacetate copolymer, hereinafter referred to as a PVP/VA copolymer, and (ii) at least one additional polymer having an acid number in the range 30–400 mg KOH/g and a melting point of at least 80° C., with 20 to 50% mole % of the said PVP/VA copolymer being derived from vinylpyrrolidone monomer, and the amount of PVP/VA copolymer in the said blend being from 15 to 70% by weight, based on the total dry weight of the adhesive layer.

In a further aspect, the present invention provides use as the lacquer layer in a hot-stamping foil of a blend of at least 50% by weight, based on the total dry weight of the lacquer composition, of a copolymer of styrene and maleic anhydride with at least one or other acrylic copolymer selected from polymethylmethacrylate copolymers, polyacrylic acid copolymers and styrene/acrylic acid copolymers.

The structure of a typical hot-stamping foil in accordance with the invention is illustrated in FIG. 1 of the accompanying drawings, which shows a hot-stamping foil (1) comprising a polyester carrier layer (2) approximately 12 microns thick carrying a wax-based release layer (4) approximately 0.01 micron thick. To the underside of the release layer (4) there is applied in sequence a lacquer layer (6) approximately 1 micron thick, a metallic layer (8) approximately 0.01 micron thick, and finally a layer (10) of heat-activated adhesive approximately 1.5 microns thick.

The present invention will now be illustrated further by the following Examples.

EXAMPLES 1 and 2

Lacquer solutions were prepared as described below and then applied, in conventional manner, by gravure coating over a conventional wax-based release layer (approximately 0.01 micron thick) carried by rolls of conventional 12 micron gauge polyethylene terephtalate carrier film. The dry coating weight of the lacquer films was approximately 1.2 to 1.4 g/m$^2$ and produced a layer of lacquer approximately 1–1.5 microns thick.

A vacuum metallised aluminium layer (approximately 15 millimicrons thick) is then applied over the lacquer layer, followed by a layer of heat-activated adhesive (approximately 1.5 microns thick). The heat-activated adhesive was a polyvinyl pyrrolidone/vinylacetate adhesive of the type described in our co-pending U.K. Patent Application No. 9505607.3.

Example (1)

(a) Preparation of solution of zirconium propionate in industrial methylated spirits (IMS).

A quantity of 3.80 parts by weight of IMS was added to a mixing vessel and 1.24 parts by weight of zirconium propionate was added slowly whilst stirring. The mixture was stirred until solution was complete.

(b) A quantity of 20.66 parts by weight of methyl ethyl ketone (MEK) was added to a mixing vessel and 8.85 parts by weight of a polymethylmethacrylate polymer of average molecular weight 120,000 g/mol (available from Rohm and Haas as Paraloid A21 polymer) was added whilst stirring. The mixture was stirred under high speed shear conditions until complete solution was obtained. Afterwards, a further quantity of 52.20 parts by weight of MEK followed by 13.25 parts by weight a styrene/maleic anhydride copolymer (available from Elf Atochem as SMA 1000) were added and stirred into solution. Finally, 5.04 parts by weight of the zirconium propionate solution prepared as described in (a) above was added slowly while stirring.

This procedure gave a clear stable lacquer solution of total solids content 23.3% by weight, and a measured viscosity of 18 seconds using a Zahn 2 cup at 20° C.

Example (2)

A quantity of 70.10 parts by weight of MEK was added to a mixing vessel and 16.10 parts of a styrene/maleic anhydride copolymer (available from Elf Atochem as SMA 11,000) were added and stirred to complete solution. Afterwards, a quantity of 13.80 parts of a polymethylmethylacrylate polymer of average molecular weight 20,000 g/mol (available from Rohm and Haas as Paraloid B99 polymer solution) was added and the mixture stirred until complete solution was obtained.

This procedure gave a clear stable lacquer solution of total solids content 23% by weight and a viscosity of 17 to 18 seconds when measured using a Zahn 2 cup at 20° C.

The lacquer compositions described in Examples 1 and 2 showed an improved heat resistance and were found to be capable of withstanding die face temperatures of 155° C. The lacquer compositions were incorporated into a hot-stamping foil and tested on a Heidelberg cylinder hot foil stamping press using a die face temperature of 155° C. The foil was applied to an "Astralux" substrate at the rate of 3000 sheets/hour. The temperature at which the foil lost its gloss (i.e. the dulling temperature of the lacquer) was measured. Loss of gloss was determined visually and also on a Rhopoint statistical Novoglass meter at a 60° angle.

The lacquer composition of Example 1 exhibited a dulling temperature of 155° C. and its gloss value fell from 800 gloss units to 400 gloss units.

The lacquer composition of Example 2 exhibited a dulling temperature of 160° C. and its gloss value fell from 820 gloss units to 400 gloss units.

In contrast, chlorinated rubber based lacquers generally do not withstand temperatures above 135° C. and nitrocellulose based lacquers do not withstand temperatures above 140° C.

The lacquers described in Examples 1 and 2 contain no colourants and are suitable for manufacturing stamping foils exhibiting silver metallic effects. Coloured metallic effects such as gold shades can be obtained by incorporating chrome complexed solvent soluble dyes, such as CI solvent yellow 62 and CI solvent orange 41, into the lacquer composition. Such dyes can be incorporated into the lacquer compositions of Example 1 or 2 simply by stirring into solution at the end of the processes described.

A formulation for Example 2 in a gold shade is outlined below:

| | |
|---|---|
| MEK | 68.60 |
| SMA 11,000 | 15.78 |
| Paraloid B99 | 13.52 |
| CI Solvent yellow 62 | 0.75 |
| CI Solvent orange 41 | 1.35 |
| | 100 parts by weight |

We claim:

1. A hot-stamping foil comprising a metallic layer carried on a flexible carrier layer, and having a layer of a heat-activated adhesive on the surface of the metallic layer opposite the carrier layer and a layer of a lacquer composition coating the surface of the metallic layer facing the carrier layer, the lacquer being a blend of at least 50% by weight, based on the total dry weight of the lacquer composition, of a copolymer of styrene and maleic anhydride (SMA copolymer) with at least one other acrylic copolymer selected from polymethylmethacrylate copolymers, polyacrylic acid copolymers and styrene/acrylic acid copolymers.

2. A hot-stamping foil according to claim 1, wherein the mole ratio of styrene to maleic anhydride in the SMA copolymer is 1:1.

3. A hot-stamping foil according to claim 1, wherein the average molecular weight of the SMA copolymer is from 1,000 to 300,000 g/mol.

4. A hot-stamping foil according to claim 1, wherein the amount of SMA copolymer is from 50 to 80% by weight, based on the total dry weight of the lacquer composition.

5. A hot-stamping foil according to claim 4, wherein the amount of SMA copolymer is from 60 to 70% by weight, based on the total dry weight of the lacquer composition.

6. A hot-stamping foil according to claim 1, wherein the other acrylic copolymer is a polymethylmethacrylate copolymer, a polyacrylic acid copolymer or a styrene/acrylic acid copolymer, each having a glass transition temperature (Tg) of 75° to 110° C. and an average molecular weight of from 20,000 to 200,000 g/mol.

7. A hot-stamping foil according to claim 1, wherein the amount of the other acrylic copolymer is from 20 to 50% by weight, based on the total dry weight of the lacquer composition.

8. A hot-stamping foil according to claim 1, wherein the lacquer composition further comprises an ionomeric cross-linking agent.

9. A hot-stamping foil according to claim 8, wherein the ionomeric cross-linking agent is selected from zirconium propionate, zirconium acetate, zirconium acetylacetonate and titanium acetylacetonate.

10. A hot-stamping foil according to claim 8, wherein the amount of the ionomeric cross-linking agent in the lacquer is from 1 to 7% by weight, based on the total dry weight of the lacquer composition.

11. A hot-stamping foil according to claim 1, wherein the heat-activated adhesive is a blend of (i) a vinylpyrrolidone-/vinylacetate copolymer (PVP/VA copolymer), and (ii) at least one additional polymer having an acid number in the range 30–400 mg KOH/g and a melting point of at least 80° C., with said PVP/VA copolymer containing 20 to 50% mole % of vinylpyrrolidone monomer, and the amount of PVP/VA copolymer in the blend of (i) and (ii) being from 15 to 70% by weight, based on the total dry weight of the adhesive layer.

* * * * *